Jan. 17, 1967  W. H. WYLIE  3,298,292
COMPACTION VEHICLE
Filed Nov. 26, 1963  2 Sheets-Sheet 1

INVENTOR.
William H. Wylie
BY E. Micky Hubbard
Attorney

Jan. 17, 1967 W. H. WYLIE 3,298,292
COMPACTION VEHICLE
Filed Nov. 26, 1963 2 Sheets-Sheet 2

INVENTOR.
William H. Wylie
BY C. Mickey Hubbard
Attorney

United States Patent Office 3,298,292
Patented Jan. 17, 1967

3,298,292
COMPACTION VEHICLE
William H. Wylie, Oklahoma City, Okla., assignor to Wylie Manufacturing Company, Oklahoma City, Okla., a corporation of Oklahoma
Filed Nov. 26, 1963, Ser. No. 327,171
16 Claims. (Cl. 94—50)

The present invention relates to compaction rollers for roads, driveways, parking lots, tennis courts and the like.

Compaction vehicles which utilize cylindrical metal rollers as support and compaction wheels may be classified generally as three wheel and two wheel. The larger compaction vehicles tend to employ three rollers deployed in a tricycle-like arrangement with one steerable roller in front and two separated drive rollers in the rear. The front roller provides a continuous compaction surface substantially narrower than the vehicle, and the two rear rollers are positioned to compact the surface passing at each end of the front steering roller. The steering roller is split in half so as to facilitate turning and lessen scrubbing and scuffing of the surface due to the different rim velocities required at the inside and outside turning radii. In this type of roller, the outer ends of the rear compaction rollers usually extend beyond the sides of the vehicle chassis. The rear rollers are usually driven through a differential to reduce stresses during turns.

The two-wheeled compaction vehicle is usually of smaller size than the three-wheeled vehicle described above and employs continuous compaction rollers both in the front for steering in the rear for propulsion. These continuous rollers are also split to provide two separately suspended rollers to facilitate turning. However, the rollers must be connected to the chassis by a yoke or framework extending around the ends of each of the rollers so that neither of the rollers can extend beyond the side of the chassis of the vehicle because of the yokes.

Neither of the types of steel-wheel compaction vehicles presently on the market provides a suitable means for compacting parking lots, tennis courts or the like immediately adjacent buildings, curbs or other obstructions. Neither the front or rear compaction roller of the three-wheeled type machine compacts the entire width of the machine. The front wheels cannot be rolled immediately adjacent the curb because of the rear wheels which extend further than the front wheels so that an uncompacted strip is left beside the rollers having a length at least equal to the length of the behicle as the vehicle approaches a corner, unless the vehicle is turned around and the rear wheels also backed into the corner. On the other hand, the two-wheeled vehicles which provide continuous rollers at both the front and rear cannot be run close to a wall or other obstruction because the yoke extending beyond the ends of the rollers usually requires four inches to one foot spacing.

Therefore, an important object of the present invention is to provide a continuous compaction roller having a length greater than the width of any portion of the chassis of the vehicle to which the roller may be attached including any yoke or other means for connecting the roller to the chassis. Without intending to limit the invention at this time, the continuous roller comprises at least two cylindrical rollers disposed in end-abutting relationship. One of the compaction rollers is of greater diameter than the other so as to provide a space between the upper edges of the rollers. A journal member then extends through the opening into the interior of the larger roller where it is connected to the axis of rotation of the respective rollers by separate axle means. The member extending through the opening is then connected to and supports the chassis of a vehicle.

The present invention further contemplates a novel vehicle employing the novel compaction roller means for supporting at least one end of the chassis and one or more of the following features. A drive train may extend from a prime mover supported by the chassis through the opening between the two rollers and be connected to drive at least one of the rollers for propelling the vehicle. The drive train may be provided with a differential so that the plurality of rollers forming the continuous compaction surface will produce a minimum amount of scuff as a result of turning. A similar novel roller means may be provided at the front of the vehicle and steered to guide the vehicle. The compaction rollers may be substantially hollow so as to comprise large liquid tanks for receiving a ballast liquid. The chassis may also be provided with a ballast tank so that a relatively small machine will have a very high weight per linear foot of compaction even though a greater amount of linear feet may be compacted. Compaction rollers substantially wider than have heretofore been practicable are made available by this invention because the rollers may be supported at intermediate points along the roller without appreciably interrupting the compaction surface. A compaction machine having at least one roller of greater length than the width of the chassis provides a means for compacting the surface immediately adjacent vertical walls and other obstructions and provides a means for compacting all of the surface adjacent a corner except for a small square having dimensions equal to the radius of the largest roller of the vehicle. Both the front and rear compaction rollers may have a continuous length greater than any portion of the chassis. Any number of the rollers may be driven so as to provide maximum traction for the vehicle.

Many additional advantages of the persent invention will be evident to those skilled in the art from the following detailed description and drawings, wherein.

Figure 1:
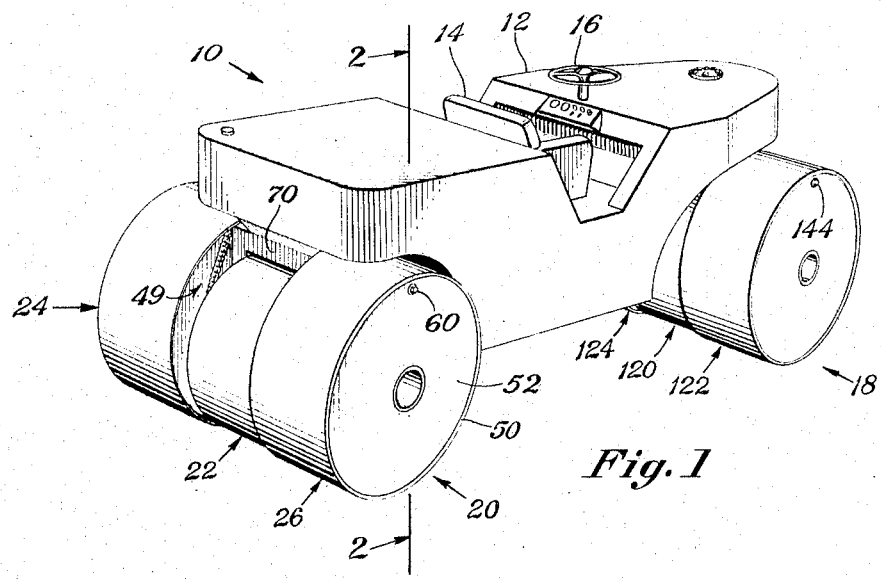
FIGURE 1 is a perspective view of a compaction vehicle constructed in accordance with the present invention.

Referring now to the drawings, and in particular to FIGURE 1, a compaction vehicle constructed in accordance with the present invention is indicated generally by the reference numeral 10. The compaction vehicle 10 comprises an elongated chassis 12 having an operator's seat 14 and a steering wheel 16 which is connected to a steering system which will hereafter be described. A suitable prime mover (not illustrated) is supported by the chassis 12. The chassis 12 preferably includes a liquid ballast tank 17 for receiving a ballast liquid such as water. Both the front and rear ends of the chassis 12 are connected to and supported by novel continuous compaction roller means 18 and 20, respectively, which are constructed in accordance with the present invention.

The rear compaction roller means 20 is comprised of a center roller 22 and outer rollers 24 and 26. The center roller 22 has a cylindrical compaction surface 22a and an axle 28 which extends from each end of the roller. The center roller 22 is preferably fabricated by welding a pair of disc-shaped end walls 29 and 30 in the ends of a cylindrical wall 32 so as to provide a liquid tank 34 for receiving water or other suitable ballast. A bunghole 36 is provided adjacent the rim for filling the tank 34.

The outer roller 24 has a cylindrical compaction surface 24a which is of greater diameter than the compaction surface 22a of the center roller. The compaction surface 24a is preferably formed by a cylindrical wall 38 and two doughnut-shaped end walls 40 and 42, and a smaller cylindrical inner wall 44. These members are preferably welded together to form an integral roller and a doughnut-shaped liquid tank 46. The tank 46 can be filled through a suitably-located bunghole 48. The cylindrical wall 38 extends beyond the doughnut-shaped end wall 42 to form a flange portion 38a which is disposed immediately adjacent the end of the cylindrical surface 22a of the center roller. The flange portion 38a forms a relatively thin rim and leaves a sizable opening 49 (see FIGURE 1) between the rim of the center roller and the flange portion 38a.

The outer roller 26 is substantially identical to the roller 24 and has a cylindrical compaction surface 26a formed by a cylindrical wall 50 having an inwardly-extending flange portion 50a. The diameter of the compaction surface 26a is equal to the diameter of the compaction surface 24a and therefore has a diameter greater than that of the center roller 22 to provide an opening 51 (see FIGURE 3) between the flange portion 50a and the top of the center roller. The outer roller 26 is also formed by the cylindrical wall 50, doughnut-shaped end walls 52 and 54, and cylindrical inner wall 56 which are integrally welded to form a doughnut-shaped liquid ballast tank 58 which may be filled through the bunghole 60.

A suitable yoke 70 has a generally horizontally-extending portion 72 which is connected to the chassis 12 and passes through the openings 49 and 51 formed between the flange portions 38a and 50a, respectively, and the center roller 22. The yoke 70 also has downwardly-extending leg portions 74 and 76 which are connected to the end of the center roller axle 28 by pillow blocks 78 and 80 and suitable bearings. Stub axles 82 and 84 are also connected to the vertically-extending portions 74 and 76 and are received in hubs 86 and 88 which are disposed within the cylindrical inner walls 44 and 56, respectively, and are connected to the interior doughnut-shaped end walls 42 and 54 of the respective outer rollers. Thus it will be noted that the yoke 70 interconnects the three rollers 22, 24 and 26 and also connects the rollers to the chassis 12 to support the chassis.

It will be noted from the drawings that the use of the yoke 70 with the depending leg portions 74 and 76 permits the center roller 22 to have a diameter greater than one-half the diameter of the outer rollers 24 and 26, and in fact to approach the diameter of the outer rollers. This is true because the stub axles 82 and 84 on which the outer rollers are journaled may be connected to the vertically depending portions 74 and 76 at a point as near the axle 28 as desired, and well below the top of the center roller.

A drive train extends from a prime mover (not illustrated) generally along the yoke 70 to drive one or more of the rollers 22, 24 or 26. The drive train is comprised of a drive shaft 90, a universal 92, and a suitable differential 94. Horizontally-extending drive shafts 96 and 98 extend from the differential 94. Chain sprockets 100 and 102 are connected to the outer ends of the shafts 96 and 98 and are disposed within the flange portions 38a and 50a, respectively, of the outer rollers. Chain sprockets 104 and 106 are disposed around the stub axles 82 and 84, respectively, and are connected to the interior walls 42 and 54 by bolts 108 and 110, respectively. A chain 112 passes around the sprockets 100 and 104. A similar chain 114 passes around the sprockets 102 and 106 to complete the drive train. Thus it will be noted that the drive train is connected to drive the outer rollers 24 and 26 and thereby propel the vehicle 10. The differential 94 permits the rollers 24 and 26 to rotate at different speeds and relieves stresses as the vehicle turns.

Figure 4:
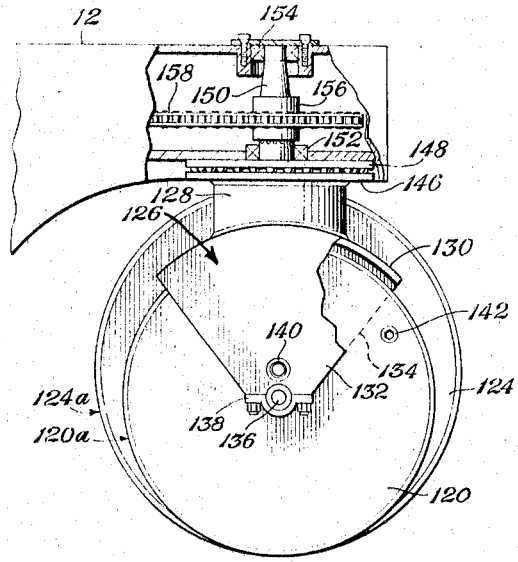
FIGURE 4 is a side elevation of the front end of the vehicle shown in FIGURE 1 with the nearest outside roller removed and portions of the vehicle broken away to reveal details of construction.

The front continuous compaction roller means 18 is also comprised of a center roller 120 and two outer rollers 122 and 124 as can best be seen by close attention to FIGURE 1. The center roller 120 may be of substantially the same construction as the center roller 22 and has a cylindrical compaction surface 120a as can best be seen in FIGURE 4. The outer rollers 122 and 124 may be of the same general type of construction as the outer rollers 24 and 26, and have generally cylindrical compaction surfaces of greater diameter than the compaction surface of the center roller 120 so as to provide an opening between the center roller and each of the outer rollers such as the opening 125 between the center roller 120 and the outer roller 124.

A yoke, indicated generally by the reference numeral 126, is comprised of a vertically-extending portion 128, a generally horizontally-extending portion 130, and generally vertically-depending portions 132 and 134. The vertically-extending portion 128 may be comprised of a cylindrical sleeve welded to the center of the horizontal member 130. It will be noted that the member 130 has an arcuate cross section so as to provide a relatively thin member for passing through relatively narrow openings formed between the center and outer rollers. This permits the diameter of the center roller 120 to more nearly approach the diameters of the outer rollers 122 and 124. The vertically-depending portions 132 and 134 are welded to the ends of the arcuate horizontal portion 130 and are also of sheet material construction so that the space provided between the adjacent ends walls of the center roller and the respective outer rollers can be reduced to a minimum and still accommodate the vertical portions 132 and 134.

The center roller 120 has an axle 136 which is connected to the portions 132 and 134 by suitable pillow blocks 138, only one of which is shown in the drawings. Suitable stub axles 140, only one of which is shown in the drawings, are also connected to the vertical members 132 and 134 for rotatably connecting outer rollers 122 and 124 to the yoke as previously described in connection with the roller means 20. The center roller 120 and the outer rollers 122 and 124 are also preferably constructed in such a manner as to provide liquid tanks (not illustrated) for receiving a ballast liquid. Suitable bungholes 142 and 144 may be provided for filling the tanks.

The upper end of the yoke 126 is pivotally connected to the chassis 12 for oscillation about a vertical axis so that the vehicle can be steered. The vertical portion 128 of the yoke 126 is preferably provided with a horizontally-disposed circular plate 146 which serves as an upwardly-facing bearing race. A second plate 148 is connected to the chassis 12 to serve as a downwardly-facing bearing race. A kingpin 150 is connected to the vertical portion 128 of the yoke and is journaled in suitable bearings 152 and 154. A chain sprocket 156 is splined to the kingpin 150 and receives a chain 158. The chain 158 also passes around a sprocket (not illustrated) splined to the lower end of the shaft of the steering wheel 16.

Thus it will be evident that the yoke 126 is pivotally connected to the chassis 12 for oscillation about a generally vertical axis. This oscillation is effected by the steering mechanism comprised of the steering wheel 16, the unseen sprocket connected to the steering shaft, the chain 158 and the sprocket 156 so that the roller means 18 can be manipulated to steer the vehicle. It will also be appreciated that the three rollers 120, 122 and 124 are independently journaled on the yoke 126 so as to permit different rim speeds as the vehicle turns and thereby reduce scuffing to a minimum. The combined length of the three rollers 120, 122 and 124 is preferably greater than the width of the chassis 12, and is preferably equal to the combined length of the three rollers 22, 24 and 26.

Figure 5:
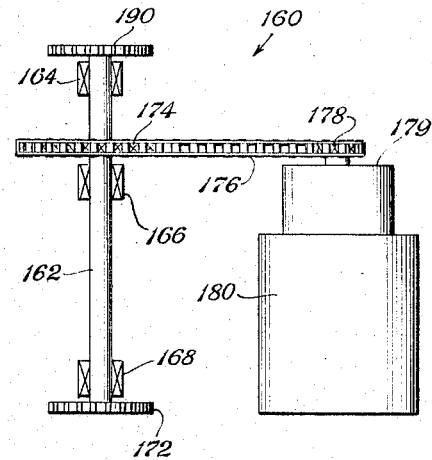
FIGURE 5 is a simplified drawing of a portion of an alternative drive train for the vehicle of FIGURE 1.

Referring now to FIGURE 5, a simplified and alternative drive train for propelling the vehicle 10 is indicated generally by the reference numeral 160. The drive train 160 comprises a horizontal drive shaft 162 which would be disposed in substantially the position of the drive shafts 96 and 98 of the drive train shown in FIGURE 2. The shaft 162 may be journaled by suitable bearings 164, 166 and 168 in the horizontal portion 72 of the yoke 70. Chain sprockets 170 and 172 are connected to ends of the shaft 162 and correspond to the sprockets 100 and 102 illustrated in FIGURE 2. The remainder of the drive train 160 extending to the rollers 22 and 24 would be the same as the drive train illustrated in FIGURE 2 including the chain sprockets 104 and 106 and the chains 112 and 114. A chain sprocket 174 is connected to a midpoint of the shaft 162. A sprocket 178 is connected to the drive shaft extending from the transmission 179 of a prime mover 180. A chain 176 passes around the sprockets 174 and 178 to complete the drive train. This very simple drive train permits the prime mover 180 to be positioned transversely of the chassis 12 very close to the shaft 62 so as to occupy a minimum space within the chassis 12. This permits the chassis 12 to be made shorter in order to provide a short wheel base and also permits the ballast tank 15 to be made larger.

Figure 6:
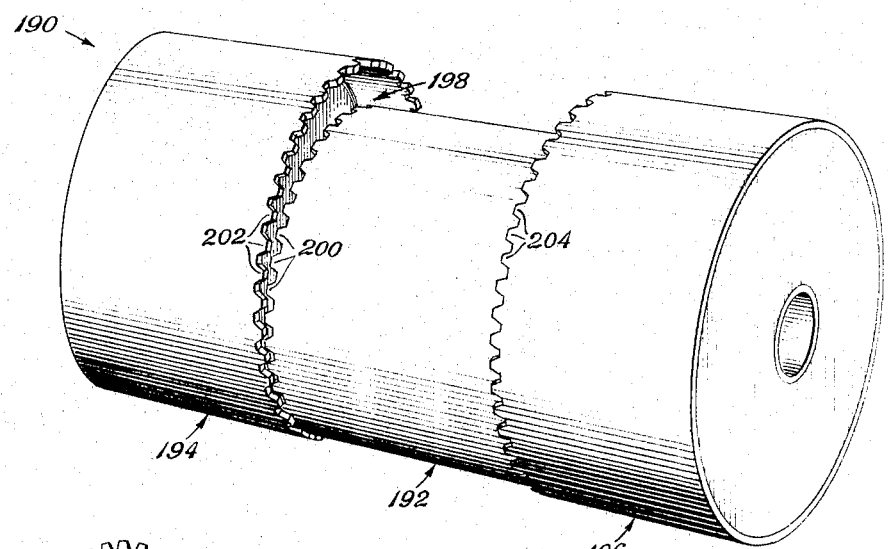
FIGURE 6 is a perspective view of three rollers constructed in accordance with the present invention illustrating one manner by which one or more of the rollers may be driven from another of the rollers; and, FIGURE 7 is a simplified, somewhat schematic drawing of another gearing system which can be used to drive the center roller of the vehicle of FIGURE 1 from one of the outer rollers.

Another continuous compaction roller means constructed in accordance with the present invention is indicated generally by the reference numeral 190 in FIGURE 6. The compaction roller means 190 may be substantially identical to the compaction roller means 20 and includes a center roller 192 and two outer rollers 194 and 196 of greater diameter so as to provide openings, one of which is indicated generally by the reference numeral 198, for receiving a yoke such as the yoke 70. A drive train similar to that illustrated in FIGURE 5 may be used for driving at least one of the rollers 192, 194 or 196. The opposite edges of the center roller 192 are provided with gear teeth 200 (only one set of which is illustrated) which mesh with gear teeth 202 and gear teeth 204 on the inner edges of the rims of the outer rollers 194 and 196.

These intermeshing gear teeth, at the rims of the respective rollers, provide a means for interlocking two or more of the rollers so that by driving any one of the interlocked rollers, the others are also driven. For example, the outer roller 194 may be driven and the center roller 192 and the other outer roller 196 will be driven by the intermeshing gear teeth. Or the center roller 192 can be driven, and the two outer rollers 194 and 196 would then be driven by the rim gear teeth. In most instances, it would be preferable to drive the two outer rollers 194 and 196 by a drive train having a differential such as the drive train illustrated in FIGURE 2, and drive the center roller 192 from only one of the outer rollers by a single set of intermeshing rim gear teeth so as to reduce scuffing as the vehicle turns and to reduce internal stresses. But in either event, it will be evident that the novel construction provides a simple means for driving all rollers to produce maximum traction. The novel construction also eliminates the very thin straight line ridge which would otherwise result from passage of the very closely spaced rollers.

Figure 7:
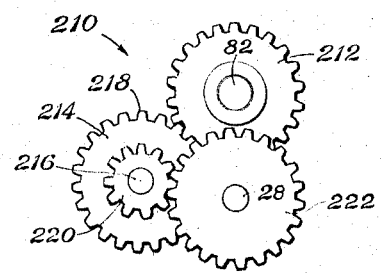

Referring now to FIGURE 7, another drive train for driving the center roller 24 of the vehicle 10 is indicated generally by the reference numeral 210. The drive train 210 is adapted to be used in connection with either of the drive trains illustrated in FIGURES 2 or 5, or any other suitable drive train for driving either the center roller 22 or either of the outer rollers 24 or 26. The drive train comprises a first gear 212 which would be disposed around, but not connected to, the stub axle 82. However, the gear 212 is connected to the sprocket 104. A step-up idler gear 214 is journaled on a suitable axle 216 which may be connected to the upright member 74. The gear 214 has an outer set of teeth 218 which mesh with the teeth of the gear 212, and also an inner set of teeth 220 which mesh with a third gear 222. The third gear 222 is connected to the axle 28 of the center roller 22. Thus it will be seen that as the outer roller 24 is driven by one of the drive trains previously described, the center wheel 22 will be driven through the three gears 212, 214 and 222 at a greater proportional speed such that each roller will have the same rim speed. It will also be evident that the center roller 22 could be driven by the drive train from the prime mover and each of the outer rollers 24 and 26 driven by a drive train such as illustrated in FIGURE 7.

From the above detailed description of several preferred embodiments of the present invention, it will be evident that a unique and highly useful compaction vehicle has been described. The compaction vehicle has substantially continuous compaction surfaces at both the front and rear ends which extend beyond the chassis of the vehicle so that compaction of the earth immediately adjacent vertically-rising obstructions such as walls and the like can be easily accomplished. Compaction surfaces of substantially greater width than were heretofore available in steel wheel rollers can be manufactured because of the fact that suitable supports may be provided at intermediate points without interrupting the continuous compaction surface and because the compaction surface is divided into a plurality of separate rollers which can rotate independently so as to reduce scuffing and promote ease of steering. Further, a very simple drive train can be used to propel the vehicle.

Figures 2, 3:
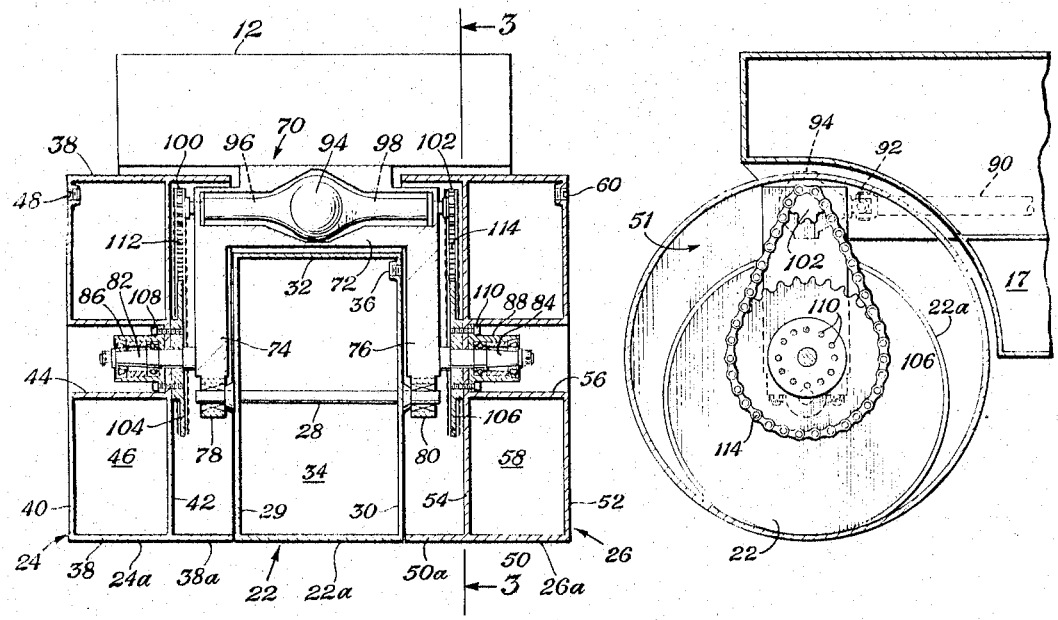
FIGURE 2 is a sectional view taken substantially on lines 2—2 of FIGURE 1.
FIGURE 3 is a sectional view taken substantially on lines 3—3 of FIGURE 2.

It will be appreciated by those skilled in the art that both the front and rear compaction roller means 18 and 20 can be driven if desired by using the teachings of the present invention. This can be accomplished by using a yoke and drive train substantially as illustrated in FIGURE 2, pivotally connecting the yoke to the chassis in the general manner that the yoke 126 is connected to the chassis, rotating the differential 94 through 90 degrees such that the drive shaft 90 extends vertically upwardly along the pivotal axis of the yoke, and then driving the shaft 90 by any suitable means.

Any one or all of the rollers can be driven so as to provide maximum traction. It will also be appreciated that any number of rollers can be placed in end-to-end relationship by using one or more yokes so as to provide a continuous compaction surface of substantially any length desired. It will also be evident that the broader aspects of the invention are not limited to steel wheel rollers, but may be applied to pneumatic wheeled rollers as well. The major portion of the volume of the several rollers and the chassis 12 can be utilized for ballast liquid so that a relatively small vehicle may be made unusually heavy. In this connection, it will be appreciated that a greater weight is desirable in view of the greater total length of compaction surface made available by reason of the novel compaction surfaces.

Although several preferred embodiments of the invention have been described in detail, it is to be understood that various changes, substitutions and alterations can be made therein without departing from the spirit and scope of the invention as defined by the appended claims.

What is claimed is:

1. A continuous compaction roller comprising:
   a center roller having a generally cylindrical compaction surface and opposite ends,
   an outer roller having a generally cylindrical compaction surface disposed adjacent each of the opposite ends of the first roller such that the three rollers provide a substantially continuous compaction surface, the outer rollers having inside diameters adjacent the ends of the center roller greater than the diameter of the compaction surface of the center roller and being open at the ends adjacent the center roller to provide an opening between the center roller and each of the outer rollers, yoke means extending through the openings between the center roller and the outer rollers having depending portions extending downwardly along the opposite ends of the center roller, and journal means on the depending portions of the yoke means rotatably connecting the opposite ends of the center roller and the outer rollers to the depending portions of the yoke means at points below the top of the center roller.

2. A continuous compaction roller comprising:

a yoke having a horizontally extending portion and a generally vertically depending portion at each end, a center roller having a generally cylindrical compaction surface journaled between the generally vertically depending portions of the yoke, and at least one outer roller having a generally cylindrical compaction surface of greater diameter than the center roller journaled on a stub axle connected to one of the vertically depending portions of the yoke at a point below the top of the center roller and having a flange portion extending over the respective generally vertically depending portion of the yoke to a point immediately adjacent the respective end of the center roller to provide a substantially continuous compaction surface.

3. A continuous compaction roller as defined in claim 2 wherein:

at least one of the rollers has a liquid tank for receiving a ballast liquid.

4. A continuous compaction roller as defined in claim 2 wherein there are two outer rollers and:

each of the three rollers forms a liquid tank for receiving a ballast liquid.

5. An improved compaction vehicle comprising:

an elongated chassis having front and rear ends, a continuous compaction roller means as defined in claim 2 connected by the yoke of each roller means to each end of the elongated chassis for supporting the chassis, the yoke of the compaction roller means connected to the front end of the chassis being pivotally connected to the chassis for oscillation about a generally vertical axis, steering means connected to the yoke of the compaction roller connected to the front end of the roller for oscillating the yoke about the generally vertical axis for steering the vehicle, a prime mover connected to the chassis, and drive train means extending generally along the yoke of the compaction roller means connected to the rear of the chassis and interconnecting the prime mover and at least one roller of the compaction means for propelling the vehicle.

6. An improved compaction vehicle comprising:

a yoke having a horizontally-extending portion and a generally vertically-extending portion at each end, a center roller having a cylindrical compaction surface journaled between the generally vertically-extending portions of the yoke, an outer roller having a cylindrical compaction surface of greater diameter than that of the center roller journaled on each of the vertically-extending portions and having a flange portion extending over the generally vertically-extending portions of the yoke to a point immediately adjacent the respective ends of the center roller to provide a substantially continuous compaction surface, an elongated chassis having one end connected to the yoke and supported by the center and outer rollers, and additional support roller means connected to and supporting the other end of the chassis.

7. An improved compaction vehicle as defined in claim 6 wherein:

the yoke is pivotally connected to the chassis for oscillation about a generally vertical axis for steering the vehicle.

8. An improved compaction vehicle as defined in claim 6 wherein:

the combined length of the center and outer rollers is greater than the maximum width of the chassis, whereby the earth can be compacted immediately adjacent a wall or the like.

9. An improved compaction vehicle as defined in claim 6 further characterized by:

a prime mover mounted on the chassis, and drive train means operatively connected to the prime mover and extending generally along the yoke and operatively connected to rotate at least one of the center and outer rollers.

10. An improved compaction vehicle as defined in claim 9 wherein the drive train means includes:

shaft means extending generally along the horizontally-extending portion of the yoke and journaled thereon, a sprocket means connected to at least one end of the shaft means, a sprocket means connected to one of the rollers, and an endless flexible member operatively engaging the sprocket means connected to the end of the shaft means and the sprocket means connected to said one of the rollers.

11. An improved compaction vehicle as defined in claim 10 wherein:

the shaft means includes a differential, a sprocket means is connected to each end of the shaft means, a sprocket means is connected to each of the outer rollers, and an endless flexible member interconnects each sprocket means on the shaft means with the sprocket means on the corresponding outer roller.

12. An improved compaction vehicle as defined in claim 6 wherein:

at least one of the center and outer rollers comprises a liquid tank for receiving a ballast liquid.

13. An improved compaction vehicle as defined in claim 6 wherein:

each of the center and outer rollers includes a liquid tank for receiving a ballast liquid.

14. An improved compaction vehicle as defined in claim 9 wherein the drive train means includes:

drive means extending between the center roller and at learst one of the outer rollers for driving one of the rollers from the other.

15. An improved compaction vehicle as defined in claim 14 wherein the center roller and the outer rollers have rims and the drive means extending between the center roller and at least one of the outer rollers comprises:

intermeshing gear means on the rim of the center roller and on the rim of the outer roller.

16. A continuous compaction roller comprising:

a first roller having a generally cylindrical compaction surface and an axis of rotation, a second roller having a generally cylindrical compaction surface and an axis of rotation disposed parallel to the axis of rotation of the first roller, the rollers being disposed in end abutting relationship to provide a substantially continuous compaction surface extending axially of the rollers, the second roller having an inside diameter at the end adjacent the first roller greater than the diameter of the compaction surface of the first roller and being open at the end adjacent the first roller to provide an opening between the compaction surface of the first roller and the inside diameter of the second roller, yoke means having a generally horizontal portion extending from without the rollers through the opening between the rollers and having a depending portion extending downwardly, and journal means connected to the depending portion of the yoke means at points below the top of the first roller for rotatably connecting the rollers to the yoke means.

References Cited by the Examiner

UNITED STATES PATENTS

| | | | |
|---|---|---|---|
| 1,378,743 | 5/1921 | Warden | 94—50 |
| 1,668,142 | 5/1928 | Conger. | |
| 1,839,000 | 12/1931 | Phan-Quang | 94—50 X |
| 2,549,182 | 4/1951 | Ekenstam | 94—50 |
| 2,664,683 | 1/1954 | De Cato | 94—50 |
| 2,954,088 | 9/1960 | Williamson | 94—50 |
| 3,051,063 | 8/1962 | Roberts | 94—50 |

FOREIGN PATENTS

| | | |
|---|---|---|
| 1,031,019 | 3/1953 | France. |
| 427,671 | 4/1926 | Germany. |

JACOB L. NACKENOFF, *Primary Examiner.*